United States Patent [19]
DeTorre

[11] 4,088,255
[45] May 9, 1978

[54] APPARATUS FOR OPENING LATERAL SCORES IN MOVING GLASS SHEETS

[75] Inventor: Robert P. DeTorre, Pittsburgh, Pa.

[73] Assignee: PPG Industries, Inc., Pittsburgh, Pa.

[21] Appl. No.: 736,963

[22] Filed: Oct. 29, 1976

[51] Int. Cl.² .............................................. C03B 33/02
[52] U.S. Cl. ........................................ 225/98; 225/96.5
[58] Field of Search ...................... 225/1, 2, 4, 5, 96.5, 225/93, 98

[56] References Cited

U.S. PATENT DOCUMENTS

| | | | |
|---|---|---|---|
| 662,924 | 12/1900 | Dugon | 225/96.5 |
| 1,401,268 | 12/1921 | Manischewitz | 225/98 |
| 2,042,819 | 6/1936 | Allison | 225/98 |
| 2,150,391 | 3/1939 | Morris | 225/97 |
| 2,252,362 | 8/1941 | Carus | 225/98 |
| 3,141,589 | 7/1964 | Jochim | 225/2 |
| 3,141,592 | 7/1964 | Glynn et al. | 225/98 |
| 3,175,745 | 3/1965 | Insolio | 225/96.5 |
| 3,372,847 | 3/1968 | Walters et al. | 225/2 |
| 3,494,523 | 2/1970 | Kalvelage | 225/98 |
| 3,517,869 | 6/1970 | Dryon | 225/2 |

Primary Examiner—Frank T. Yost
Attorney, Agent, or Firm—Donald Carl Lepiane

[57] ABSTRACT

An endless belt moves a glass sheet having lateral scores along a movement path having a receiving horizontal path portion and a downwardly inclined or sloping path portion. As the leading edge of the glass sheet advances toward the end of the horizontal path section, it moves under a pinch roll. Continued movement of the sheet advances the leading edge under a snap roll spaced above the inclined path portion. The snap roll applies a downward force to the sheet to open a lateral score between the pinch roll and the snap roll. The severed glass drops onto the inclined path portion and is conveyed along the inclined path portion.

7 Claims, 9 Drawing Figures

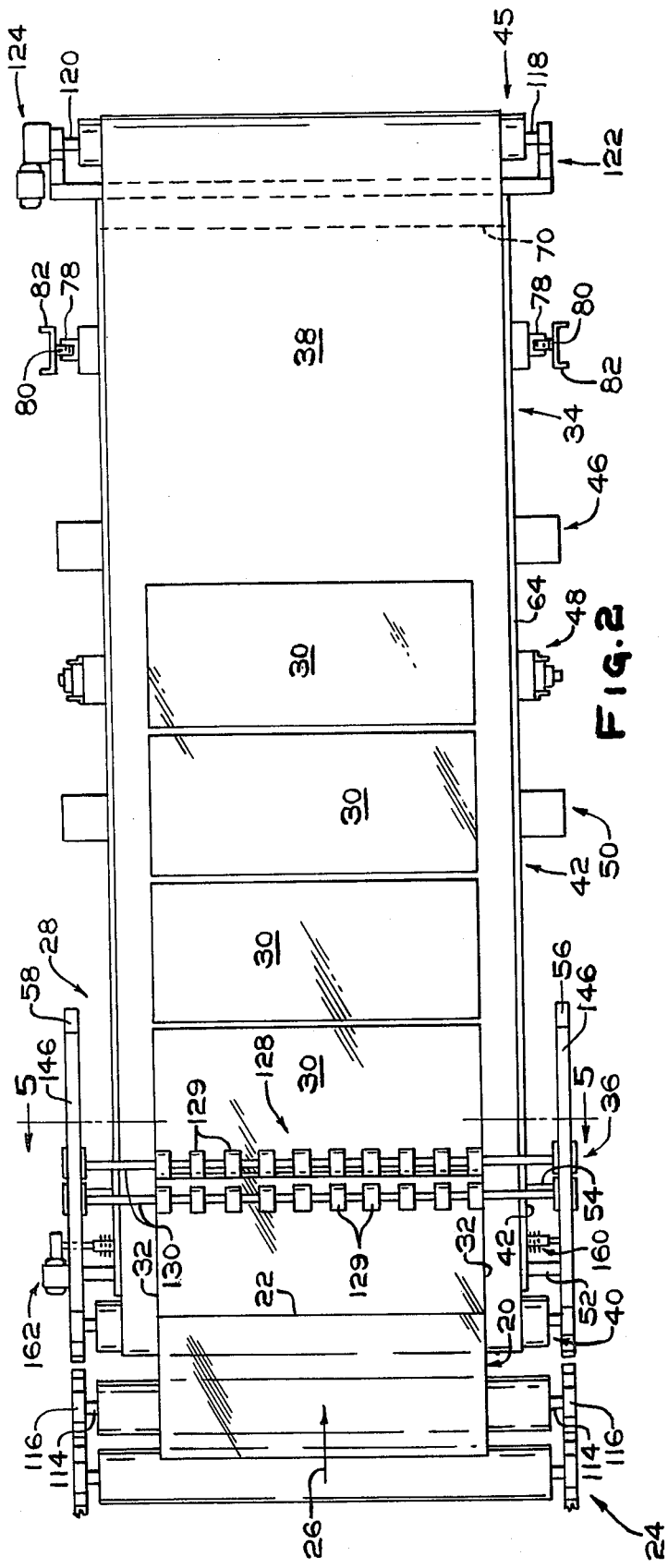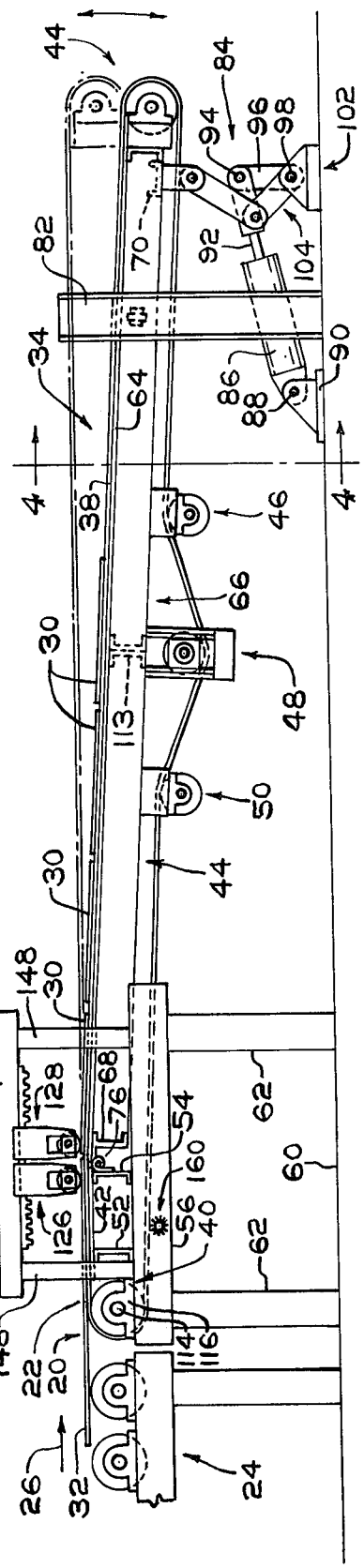

APPARATUS FOR OPENING LATERAL SCORES IN MOVING GLASS SHEETS

BACKGROUND OF THE INVENTION

1. Field of the Invention

This invention relates to an apparatus for opening lateral scores in a moving glass sheet.

2. Discussion of the Prior Art

In the prior art, there are taught various apparatuses for opening lateral scores in a glass sheet. "Lateral scores" as the term is used herein are scores, score fractures or fissures in the glass that extend between the side edges of the glass sheet as it advances along an article movement path.

U.S. Pat. No. 662,924 teaches a glass cutting machine having a half table. In general, a sheet of glass is positioned and clamped on the half table and a score is imposed on the glass sheet to coincide with the junction line of the half table. Thereafter the half tables are pivoted away from each other to open the score.

The apparatus for cutting glass taught in U.S. Pat. No. 662,924 is not adaptable for opening lateral scores in moving glass sheets and is only applicable for opening a lateral score in a stationary single sheet.

U.S. Pat. Nos. 3,141,589 and 3,175,745 teach a glass breaking apparatus that includes a horizontal conveying section and a separate inclined conveying section. A glass sheet is moved along the horizontal section as the lateral scores are opened to sever the sheet. Thereafter, the leading edge of the severed glass sheet tilts onto the inclined conveying section.

The drawback of the scoring apparatuses of the type taught in U.S. Pat. Nos. 3,141,589 and 3,175,745 is that the leading edge of the sheet engages the inclined conveying section. Under certain conditions, flares remain on the cut edge of the severed glass sheet. When these flares engage the inclined conveying section, they break off and leave chips of glass on the conveyor. These chips of glass may scratch subsequently severed glass sheet.

U.S. Pat. No. 3,372,847 teaches a glass breaking apparatus. In general, a scored glass sheet is advanced by conveyor rolls along a movement path having an upwardly inclining path portion and a downwardly inclining path portion. A holddown roll is mounted over each of the inclining path portions and a roll is rotatably mounted above the apex of the movement path and operatively connected to vibrating facilities. When the lateral score in the sheet is at the apex of the path, a bending moment is applied to the glass as the roll is vibrated to open the score and sever the sheet.

The drawback of the apparatus taught in U.S. Pat. No. 3,372,847 is the additional vibratory equipment needed to open the score and sever the sheet. Further the apparatus is limited to opening lateral scores spaced apart a distance greater than the distance between adjacent rolls to prevent the severed sections from falling between the rolls.

U.S. Pat. No. 3,494,523 also teaches a device for fracturing scored glass sheets. In general, a flexible endless belt is stretched over a plurality of pulleys. A fixed spring sheet bears against the belt to define a movement path. The spring sheet and belt are flexed to provide a curved path portion to applying bending stress to open the lateral scores and sever the sheets.

Although the fracturing device disclosed in U.S. Pat. No. 3,494,523 is acceptable for opening lateral scores in moving sheets, it has limitations. More particularly, the curved path is defined by a spring member and a belt portion between which the glass sheet is moved. Deflecting the belt and spring member applies a bending moment to open the scores. In the instance where adjacent scores are spaced a great distance apart, the glass sheet binds in the space between the belt and the spring. Reducing the curvature to permit the passing of the glass sheet reduces the stress applied to the scores. In certain instances, e.g., for glass sheets having a thickness of about ½ inch (1.27 centimeters) the bending moment force may not be adequate to open the scores and sever the sheet.

In U.S. Pat. No. 3,517,869, it is taught to advance a glass sheet in its own plane between a pair of conveyor members initially aligned in a common plane with a second pair of conveyor members. The first pair of conveyor members is tilted and the sheet having lateral scores is advanced over a breaking roll and into its original plane of advancement onto the second pair of conveyor members. The sheet is broken into segments by the breaking roll and conveyed beyond the breaking roll by the second pair of conveying members as the first pair of conveying members is tilted back to its original position to receive the next sheet.

The drawback of the apparatus of U.S. Pat. No. 3,157,869 is that it is not usable for opening scores in fast moving sheets. This is because the first conveyor section that receives the sheet is tilted out of the receiving plane and remains in that position until the scores in the sheet are opened. In the tilted position, subsequent sheets cannot be moved onto the first conveyor section.

It would be advantageous to provide an apparatus for opening lateral scores in a moving sheet that does not have the limitations of the prior art snapping apparatus.

SUMMARY OF THE INVENTION

This invention relates to an apparatus for opening score lines in a fracturable material. Facilities act on an endless belt for moving the belt along an article movement path having a receiving horizontal path portion and a downwardly inclining or sloping path portion. Holddown facilities are mounted transverse and above the receiving horizontal path portion adjacent the downwardly inclining portion. Force applying facilities are mounted transverse and above the downwardly inclining path portion. The holddown facilities and force applying facilities are positioned in spaced relation to one another to apply a bending moment force to open the scores.

This invention also relates to a method of opening a lateral score in a sheet of fracturable material, for example, glass, glass ceramics, ceramics and plastics. The method includes the steps of advancing the sheet along a horizontal path under a pinch roll while moving the leading edge of the sheet into engagement with a force applying facilities to retard the movement of the sheet. The leading edge of the sheet is further advanced under the force applying roll to apply bending moments to the sheet. As a score moves between the pinch roll and the force applying roll, the glass sheet is severed along the score to provide a section of the sheet. The section of the sheet drops on an inclined path portion and is advanced away from the force applying facilities.

BRIEF DESCRIPTION OF THE DRAWING

FIG. 1 is a side elevated view of a snapping station incorporating features of the invention;

FIG. 2 is a top view of the snapping apparatus shown in FIG. 1;

DESCRIPTION OF THE INVENTION

Figure 4:
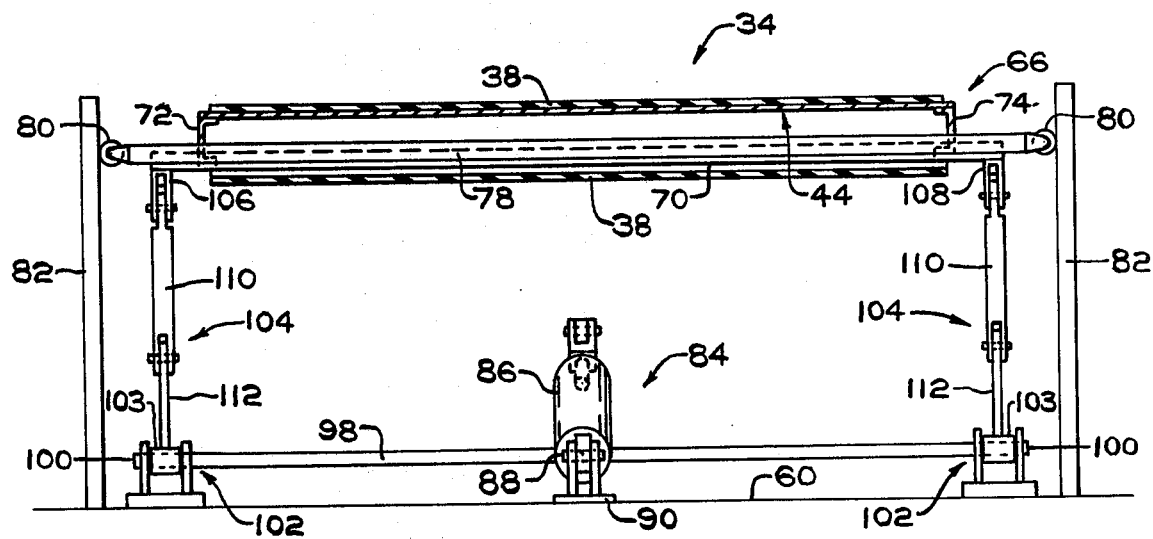
FIG. 4 is a view taken along lines 4—4 of FIG. 1 and having portions removed for purposes of clarity.

With reference to FIGS. 1 and 2, a sheet 20 of fracturable material having lateral scores 22 (one shown) is advanced along conveyor 24 in the direction of arrow 26 into snapping station 28 incorporating features of the invention. The sheet 20 is severed along the scores 22 into sections 30.

The term "lateral score" as used herein is defined as a score, score fracture or fissure extending between sides 32 of the sheet. The type of score imposed on the sheet is not limiting to the invention and may be any of the types used in the art. For example, but not limited thereto, the score may be of the type taught in U.S. Pat. Nos. 3,800,991 and 3,865,673 which teachings are hereby incorporated by reference.

In the following discussion, the sheet 20 of fracturable material is glass. However, the invention is not limited thereto and may be practiced on refractories such as (1) ceramics, e.g. MONOFRAX ® ceramics sold by the Carborundum Corporation and (2) glass-ceramics, e.g., HERCUVIT ® glass-ceramics sold by PPG Industries, Inc. and plastics.

The conveyor 24 that may be used in the practice of the invention is of the type used in the art for conveying an article or sheet along a movement path, e.g., in the direction of the arrow 26, and is not limiting to the invention. Further, the instant invention may be used to open lateral scores in a plurality of sheets moving side by side through the snapping station 28 or lateral scores on a single sheet as shown in FIGS. 1 and 2.

In general, the snapping station 28 includes a conveying section 34 for advancing the sheet 20 into a score opening section 36, e.g., along a horizontal path portion and moving the glass sections 30 away from the score opening section 36, e.g., along an inclined or sloping path portion.

The conveying section 34 includes an endless belt 38 having its course over first idler roll 40, plate 42, adjustable belt section 44, a drive roll 45, second idler roll 46, adjustable idler roll 48, a third idler roll 50.

Figure 3:
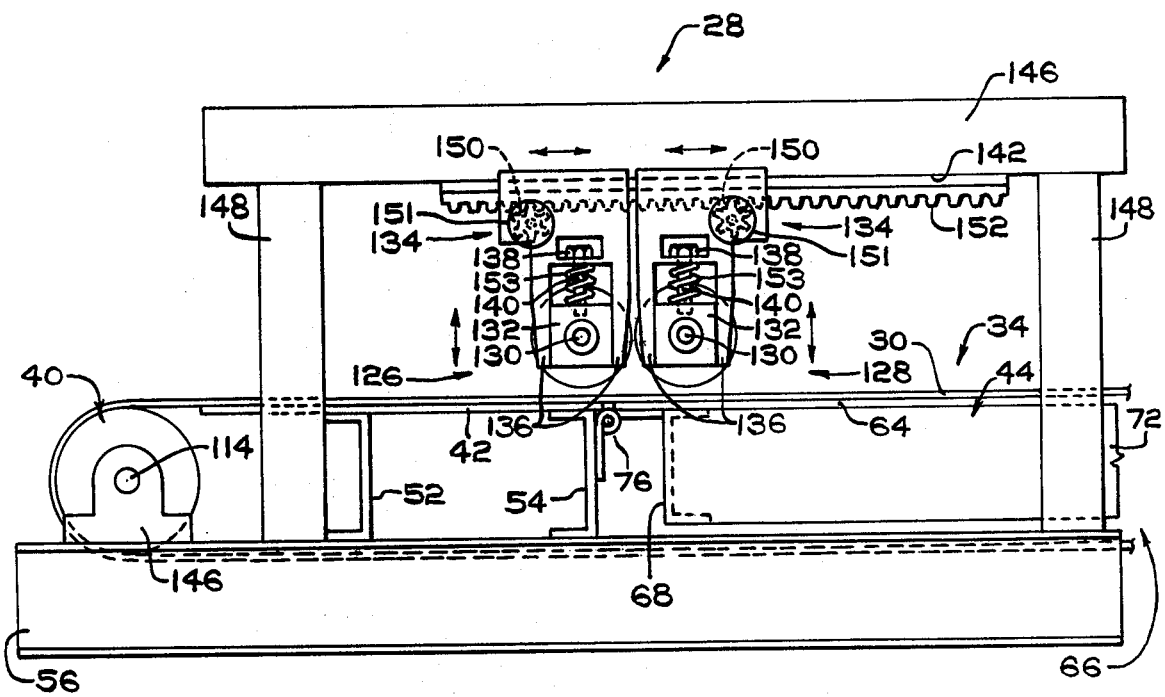
FIG. 3 is an enlarged side view of the snapping position of the snapping station shown in FIG. 2.

With reference to FIGS. 1-3, the plate 42 is mounted on and secured to a pair of lateral struts 52 and 54 to position the plate 42 in a generally horizontal position as viewed in FIGS. 1 and 3. The lateral struts 52 and 54 are each secured at their ends to longitudinal struts 56 and 58 which are each supported above floor 60 by vertical structural members 62 as shown in FIG. 1.

The adjustable belt section 44 includes a plate member 64 mounted on a rigid frame 66 made from lateral structural members 68 and 70 and longitudinal structural members 72 and 74 (see also FIG. 4).

The adjustable belt section 44 and belt 38 each have a width less than the distance between longitudinal struts 56 and 58 to move the adjustable belt section 44 along a vertical reciprocating arcuate path as viewed in FIG. 1 in any conventional manner. For example and with reference to FIGS. 3 and 4, the plate member 64 is pivotally mounted to the lateral strut 54 by hinge 76 as shown in FIG. 3.

Referring now to FIG. 4, a shaft 78 passes through and extends beyond the longitudinal structural members 72 and 74. A wheel 80 is rotatably mounted on each end of the shaft 78 and rides on vertical standards 82.

With reference to FIGS. 1 and 4, an elevator 84 is mounted on the floor 60 for moving the adjustable belt section 44 along the vertically reciprocating arcuate path to adjust the slope of the adjustable belt section 44 for reasons to be discussed below. The elevator 84 may be any of the types used in the art. For example, but not limited thereto, the elevator 84 includes a cylinder 86 pivotally mounted at 88 to yoke member 90 mounted on the floor 60. Piston 92 of the cylinder 86 is pivotally mounted at 94 to one end of linkage 96 and the other end of the linkage 96 is secured to a shaft 98. Ends 100 of the shaft 98 are rotatably mounted in yokes 102 secured to the floor 60. End 103 of linkage assembly 104 is rotatably mounted on the rod member 98 as shown in FIG. 4. The other end of each of the linkage assembly 104 is pivotally mounted at 106 and 108 to longitudinal strut members 72 and 74 respectively as shown in FIG. 4.

Each of the linkage assembly 104 includes a pair of members 110 and 112 having adjacent ends pivotally mounted together. In this manner, moving the piston 92 out of the cylinder 86 lowers the adjustable belt section 44 and retracting the piston into the cylinder raises the adjustable belt section 44 as viewed in FIG. 1.

With reference to FIGS. 1-3, the idler roller 40 has its ends 114 rotatably mounted in journals 116. The journals 116 are mounted on respective ones of the longitudinal struts 56 and 58. The idler rolls 46 and 50 are mounted in a similar manner to the longitudinal strut members 72 and 74 of the frame 66 about the adjustable idler roll 48.

The adjustable idler roll 48 is any of the type used in the art to apply tension to the belt and is not limiting to the invention. The adjustable idler roll is mounted to the longitudinal strut members 72 and 74.

An intermediate lateral strut 113 is secured within the frame 44 for structural stability.

With reference to FIG. 2, the drive roll 45 has its ends 118 and 120 rotatably mounted in bifurcated member 122. The bifurcated member 122 is mounted to the lateral structural member 70 in any conventional manner. The end 120 of the drive roll 45 rotates the belt 38, e.g., in a clockwise direction as viewed in FIG. 1.

The snapping section 28 as shown in FIGS. 1-3 includes a pinch roll 126 and a snap roll 128. The rolls 126 and 128 are identical in construction and each include a plurality of spaced donut rolls 129 mounted on shaft 130. The ends of the shafts 130 are mounted in journals 132 (one shown for each shaft in FIG. 4).

The journals 132 are mounted in bifurcated member 134 between fingers 136 for reciprocal vertical movement in any conventional manner. For example, cap end 138 of threaded shaft 140 is captured in base member 142 of the bifurcated member 134 and the other end of the threaded shaft is threaded into its respective journal 132. Rotating the threaded shaft 140 in a first direction moves the journal toward the belt 30 or article movement path and rotating the threaded shaft 140 in the opposite direction moves the journal away from the belt or article movement path. In this manner, the pinch roll 126 and snap roll 128 are positioned to hold down the glass sheet while a bending force is applied respectively to open the lateral score. In the alternative, an air cylinder may be used to move the pinch roll 126 and snap 128 toward the belt.

Figure 5:
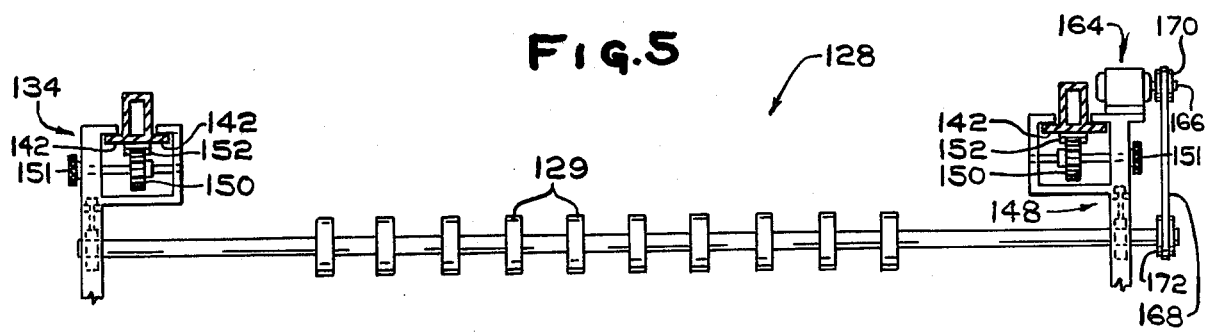
FIG. 5 is a view similar to a view taken along lines 5—5 of FIG. 1 having portions removed for purposes of clarity for showing an alternate embodiment of the invention.
Figure 6A:
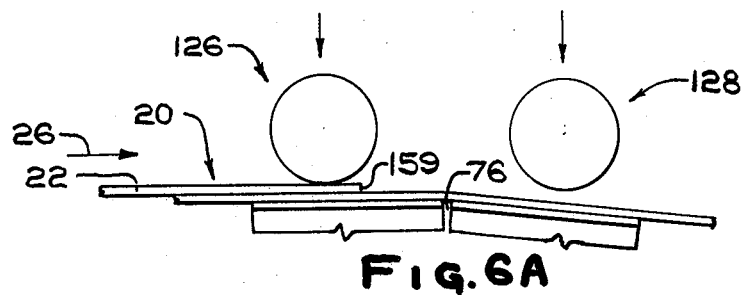
FIGS. 6A-6D are a series of illustrations showing the snapping of a sheet along lateral score lines.
Figure 6B:
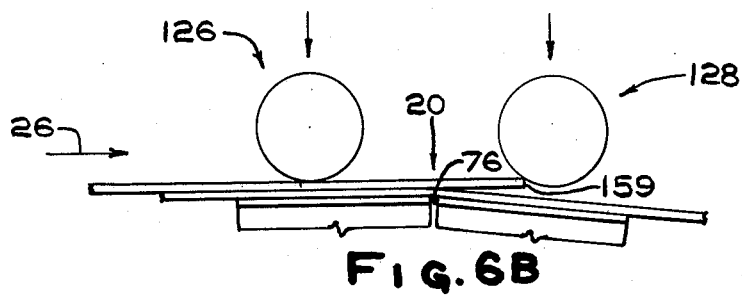
Figure 6C:
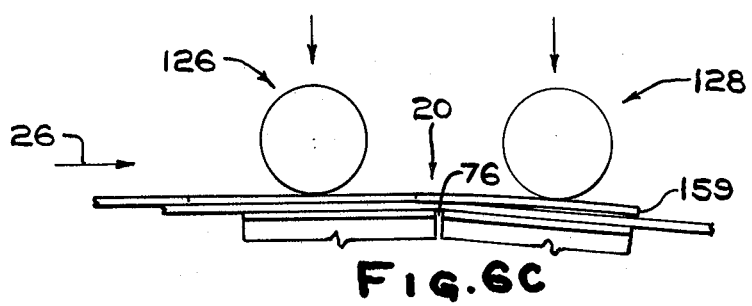
Figure 6D:
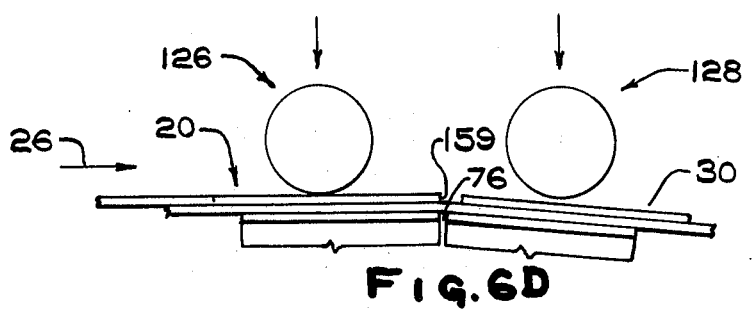

With reference to FIG. 5, the base member 142 of the pinch roll and snap roll rides on track 144 mounted on each of opposed structural member 146 for reciprocal horizontal movement of the pinch roll 126 and snap roll 128 relative to the belt. The structural members 146 are mounted above the belt by vertical posts 148 (one side only shown in FIG. 3).

The rolls 126 and 128 are each displaced to the right or left as viewed in FIG. 4 by rotating gear wheel 150 mounted to base member 142 of the pinch roll and snap roll in any conventional manner, e.g., by wheel 151. As the gear wheel 150 is rotated, the gear teeth engage teeth of track 152 mounted on the member 146 as shown in FIG. 5.

The pinch roll 126 is positioned to hold the glass sheet and the snap roll 128 is positioned to apply a downward force to the glass to open the score 22. For example the hinge 76 is considered to be a fulcrum of the bending moment with the pinch roll 126 to the left of the fulcrum and the snap roll 136 to the right of the fulcrum, as viewed in FIG. 3. The horizontal linear distance between the pinch roll and the fulcrum is determined by the distance between (1) the scores 22 and (2) the trailing edge of the glass sheet and adjacent score. As the distance between the scores decreases, the distance between the pinch roll 126 and fulcrum decreases and vice versa so that the pinch roll 126 prevents upward movement of the glass sheet away from the belt 38.

The vertical linear distance between the pinch roll 126 and belt 38 is determined by the glass thickness so that the glass is conveyed under the pinch roll by the belt. Normally a vertical linear distance between the belt and pinch roll of 1/16 inch (0.16 centimeter) greater than the glass thickness is acceptable to move the glass under the pinch roll and minimize vertical displacement of the glass when the bending moment is applied by the snap roll 128.

Normally the weight of the pinch roll is sufficient to prevent vertical displacement of the glass sheet 20. However, to insure that the pinch roll is not vertically displaced by the glass, a spring 153 may be mounted on the threaded shaft 140 between the journal 132 and the base of the bifurcated member 134 as shown in FIG. 3. Similarly a spring may be mounted on the snap roll.

As can be appreciated, the vertical linear distance between the pinch roll and the belt is not limiting to the invention. For example, the distance between the pinch roll and belt may be equal to or less than the thickness of the glass sheet.

The invention also contemplates the use of an air cylinder to move the snap roll toward the belt to urge the sheet downward to open the score.

The horizontal linear distance between the snap roll 128 and fulcrum point is determined by (1) the distance between adjacent scores and the distance between the leading edge of the glass sheet and adjacent score and (2) the bending moment to be applied to the glass sheet to open the score.

As the distance between the scores decreases, the horizontal linear distance between the snap roll and fulcrum decreases and vice versa. In this manner, each score is opened as it passes between the fulcrum and snap roll 128.

The force of the bending moment is a function of (1) the horizontal linear distance between the fulcrum and snap roll and (2) the vertical linear distance from a horizontal plane having the fulcrum and the snap roll. For a given horizontal linear distance, between the fulcrum and the snap roll, decreasing the vertical linear distance increases the bending moment and vice versa. For a given vertical linear distance, decreasing the horizontal linear distance between the fulcrum and snap roll increases the bending moment and vice versa.

The diameter of the donut rolls of the snap roll and pinch roll are not limiting to the invention. However, it is recommended that the diameter of the donut rolls of the snap roll be selected to provide a gradual application of the bending moment. Donut rolls of 2-6 inches (5.08 centimeters - 30.48 centimeters) have been found to be acceptable.

The slope of the adjustable belt section 44 is preferably selected so that the vertical distance between the belt and snap roll is at least about 1/16 inch (0.16 centimeter) greater than the thickness of the glass. In this manner, the bending moment may be applied to the glass without binding the glass between the snap roll and belt. As the distance between the snap roll and fulcrum increases, the slope of the belt section is increased and the pinch roll displaced downward to apply sufficient bending force to open the score.

With reference to FIG. 6, a glass sheet 20 having scores 22 is moved along the conveyor 24 on the belt 30 of the snapping station. The belt 30 and conveyor 24 advance the sheet under the pinch roll 126 (FIG. 6A). Continual movement of the sheet moves the leading edge 169 of the sheet into contact with the donut rolls of the snap roll 128 (FIG. 6B). The motion of the sheet moves the leading edge of the sheet downward under the rolls of the snap roll 128 (FIG. 6C). When a score line moves between the hinge or fulcrum 76 and snap roll, a bending moment is applied to open the score. In the alternative, the leading edge of the sheet urges the snap roll upward against the biasing action of the spring 153 (See FIG. 3). In this instance, the biasing action of the spring and weight of the snap roll apply a downward force to the sheet 20. The severed section 30 drops onto the belt and is conveyed away from the snap roll (FIG. 6D). In a like manner, the remaining scores are opened.

The bending moment is applied by the hinge portion acting as a fulcrum, the pinch roll preventing vertical displacement of the sheet and the snap roll applying a downward force as viewed in FIG. 6.

As the leading edge of the sheet engages the snap roll, there is a slight delay in the advancement of the sheet. During the delay, the section 30 on the belt is advanced. This delay of the sheet provides a gap between the sections to prevent edge damage to the sections.

Referring back to FIGS. 1 and 2, there is shown a brush 160 having ends rotatably mounted in the longitudinal struts 56 and 58. A one of the ends of the brush is operatively connected to motor 162 mounted on the strut 58. The brush 160 rotates in an opposite direction relative to the endless belt 30 to remove dirt and glass particles that could mar the glass surface.

In the above discussion, the shafts of the pinch roll and snap roll were mounted for free rotation. However, the invention also contemplates positively driving the pinch roll and/or snap roll.

With reference to FIG. 5, a motor 164 is mounted to the left bifurcated member as viewed in FIG. 5 and is operatively connected to an end of a shaft 166. A chain 168 passes over gear wheel 170 mounted on the shaft 166 and a gear wheel 172 is mounted on the end of the shaft of the pinch roll.

The pinch roll may be positively driven in a similar manner.

The rotational speed of the pinch roll and snap roll are not limiting to the invention. However, it is recommended that the speed of the snap roll be equal to or less than the speed of the belt to prevent the adjacent edges of the severed sections from contacting one another.

DETAILED DESCRIPTION OF THE INVENTION

The snapping apparatus shown in FIGS. 1-4 is used to open lateral scores 22 in a glass sheet having a thickness of about 1/8 inch (0.32) centimeter), a length of 9 feet (2.7 meters) and a width of 6 feet (1.8 meters).

Inclined belt portion is adjusted by the elevator mechanism 84 to provide a 4° angle subtended by the belt 30 and horizontal path portion.

The lateral scores adjacent the leading edge and trailing edge of the glass sheet are spaced about 6 inches (15.24 centimeters) from their adjacent edge. The remaining adjacent scores are spaced about 1 foot apart (0.3 meter).

Donut rolls 129 of the snap roll and pinch roll are about 4 inches (0.24 centimeter) in diameter; 1 inch (2.54 centimeters) thick and spaced about 6 inches (15.24 centimeters) apart.

With reference to FIG. 3, the pinch roll 126 is adjusted by the screw 140 to position the donut roll of the pinch roll a spaced vertical linear distance of about slightly less than ⅛ inch (0.32 centimeter) from the belt. The center of the shaft of the pinch roll is spaced a horizontal linear distance of about 2 inches (5.08 centimeters) from the hinge 76 or fulcrum.

The snap roll 128 is adjusted by the screw 140 to position the donut roll of the snap roll a spaced vertical distance of about slightly less than ⅛ inch (0.32 centimeter) from the belt. The center of the shaft of the snap roll is spaced a horizontal linear distance of about 2½ inches (6.35 centimeters) from the fulcrum.

The bending forces are the fulcrum or hinge preventing downward movement of the glass, the pinch roll preventing upward movement of the glass and the snap roll applying a downward force.

With reference to FIGS. 1 and 2, the glass sheet 20 advances from the conveyor 24 onto the belt 30 of the snapping station. The belt 30 and conveyor advance the sheet under the pinch roll and move the leading edge of the sheet into engagement with the snap roll.

The leading edge moves under the snap roll as the bending moment forces are applied to the sheet. When the score 22 is below the pinch roll and snap roll, the glass sheet is severed and the resulting glass section 30 falls onto the belt.

The new leading edge of the glass sheet engages the snap roll as the section is advanced away from the snap roll by the belt. The movement of the glass sheet is delayed until the new leading edge moves under the snap roll. During their delay, the section on the belt continues to advance.

The new leading edge of the sheet moves under the snap roll and the next score line is snapped as previously discussed. The subsequent section falls on the belt and is spaced from the previous section.

The remaining scores are snapped in a similar manner.

As can now be appreciated, the invention is not limited to the above example which was presented for illustration purposes only.

What is claimed is:

1. An apparatus for opening scores in a fracturable material, comprising:
   a horizontal plate having a first end and an opposed second end;
   a plate member having a first end and an opposed second end;
   hinge means secured adjacent the first end of said plate and the first end of said plate member;
   an endless belt;
   means for mounting said endless belt about said plate and said plate member;
   means acting on said endless belt for moving said belt along an article movement path having a receiving horizontal path portion when said belt moves over said horizontal plate and a downwardly sloping portion when said belt moves over said plate member;
   holddown means mounted transverse and above said receiving horizontal path portion adjacent said downwardly sloping path portion;
   force applying means mounted transverse and above said downwardly sloping path portion;
   said holddown means and force applying means positioned in spaced relation to one another about the junction of said horizontal path portion and said sloping path portion to apply a bending moment force to open the scores; and
   elevator means acting on said plate member for changing the slope of the sloping path portion.

2. The apparatus as set forth in claim 1 wherein said holddown means includes:
   a shaft having spaced donut rolls; and
   means acting on said shaft for moving the shaft (1) toward and away from said belt and (2) along a horizontal reciprocating path relative to said horizontal path portion.

3. The apparatus as set forth in claim 2 further including means for biasing said shaft of said holddown means toward said belt.

4. The apparatus as set forth in claim 2 further including means for rotating said shaft of said holddown means.

5. The apparatus as set forth in claim 1 wherein said force applying means includes:
   a shaft having spaced donut rolls; and
   means acting on said shaft for moving the shaft (1) toward and away from said belt and (2) along a horizontal reciprocating path relative to said inclined path portion.

6. The apparatus as set forth in claim 5 further including means for biasing said shaft of said force applying means toward said belt.

7. The apparatus as set forth in claim 5 further including means for rotating said shaft of said force applying means.

* * * * *